US012801088B2

(12) United States Patent
Yang et al.

(10) Patent No.: US 12,801,088 B2
(45) Date of Patent: Nov. 17, 2026

(54) WRISTBAND DEVICE WITH SWITCHABLE SCREEN

(71) Applicant: GOERTEK INC., Weifang (CN)

(72) Inventors: Xue Yang, Weifang (CN); Fanli Bu, Weifang (CN)

(73) Assignee: GOERTEK INC., Weifang (CN)

( * ) Notice: Subject to any disclaimer, the term of this patent is extended or adjusted under 35 U.S.C. 154(b) by 315 days.

(21) Appl. No.: 18/580,187

(22) PCT Filed: Oct. 25, 2021

(86) PCT No.: PCT/CN2021/125944
§ 371 (c)(1),
(2) Date: Jan. 18, 2024

(87) PCT Pub. No.: WO2023/005010
PCT Pub. Date: Feb. 2, 2023

(65) Prior Publication Data

US 2024/0319674 A1 Sep. 26, 2024

(30) Foreign Application Priority Data

Jul. 28, 2021 (CN) ......................... 202110857908.4

(51) Int. Cl.
*G06F 1/16* (2006.01)
*G04B 37/08* (2006.01)
(Continued)

(52) U.S. Cl.
CPC ............. *G04B 37/08* (2013.01); *G04G 9/007* (2013.01); *G04G 17/04* (2013.01)

(58) Field of Classification Search
CPC ......... G04B 37/08; G04G 9/007; G04G 17/04
See application file for complete search history.

(56) References Cited

U.S. PATENT DOCUMENTS 10,222,755 B2 * 3/2019 Coakley ................. G04B 37/10
10,840,041 B1 * 11/2020 Harms ..................... G05G 5/04
(Continued)

FOREIGN PATENT DOCUMENTS

CN 1825225 A 8/2006
CN 205403811 U 7/2016
(Continued)

OTHER PUBLICATIONS

International Search Report from International Application No. PCT/CN2021/125944 mailed Apr. 20, 2022.

*Primary Examiner* — Anthony M Haughton
(74) *Attorney, Agent, or Firm* — Shih IP Law Group, PLLC

(57) ABSTRACT

Embodiments of the present disclosure disclose a wristband device with switchable screen including: the screen; a middle frame provided with a roller which rotatable and a through hole for rotating the roller outside of the middle frame; a window frame body provided with a light transmitting window, wherein one side of the light transmitting window is provided with a light sensor assembly configured to detect a rotation of the roller and connected to a controller, and the other side of the light transmitting window is fixed to the middle frame, and the roller is located between the middle frame and the window frame body; a sealing member sealed between the window frame body and the middle frame, wherein the sealing member has an annular shape and surrounds a periphery of the through hole, to implement waterproof sealing between the through hole and an inside of the middle frame.

10 Claims, 4 Drawing Sheets

(51) Int. Cl.

| | |
|---|---|
| ***G04G 9/00*** | (2006.01) |
| ***G04G 17/04*** | (2006.01) |
| ***H05K 5/00*** | (2025.01) |
| ***H05K 7/00*** | (2006.01) |

(56) References Cited

U.S. PATENT DOCUMENTS

| | | | | |
|---|---|---|---|---|
| 11,531,306 | B2 * | 12/2022 | Ely | G06F 3/0362 |
| 2019/0278232 | A1 * | 9/2019 | Ely | G04C 3/004 |
| 2020/0004313 | A1 | 1/2020 | Kelley et al. | |

FOREIGN PATENT DOCUMENTS

| | | | |
|---|---|---|---|
| CN | 108345396 | A | 7/2018 |
| CN | 109947266 | A | 6/2019 |
| CN | 209625187 | U | 11/2019 |
| CN | 111679748 | A | 9/2020 |
| CN | 112088339 | A | 12/2020 |
| CN | 112466699 | A | 3/2021 |
| CN | 212675367 | U | 3/2021 |
| CN | 113515031 | A | 10/2021 |
| KR | 20160145284 | A | 12/2016 |

* cited by examiner

WRISTBAND DEVICE WITH SWITCHABLE SCREEN

The present application claims priority to Chinese Patent Application No. 202110857908.4, filed with the China Patent Office on Jul. 28, 2021, entitled "WRISTBAND DEVICE WITH SWITCHABLE SCREEN", the entire contents of which are incorporated herein by reference.

TECHNICAL FIELD

The present application relates to the technical field of wearable devices, and more particularly, to a wristband device with switchable screen.

BACKGROUND

Smart wearable products have become common electronic products in people's life, and with the improvement of people's requirements for electronic products, taking watches as an example, watches are no longer be just used as a time displaying tool, but have to be equipped with the continuous emerged functions, while meeting the aesthetic and experiential demands of different users. For example, a watch screen capable of convenient switching according to the aesthetics and the use of different users is very meaningful in meeting the requirements of different users.

However, the structure of the screen switching control of a variety of different types of wristband devices is very complex, which not only fails to realize fast and accurate control of the screen, but also tends to result in structural instability due to the complex structure.

Thus, it is a problem to be solved in the art for how to provide a wristband device which is convenient to control and with a stable structure.

SUMMARY

In view of the above, an object of the present disclosure is to provide a wristband device with switchable screen, which realizes the control of the screen by sensing the rotation of a roller by the light sensor assembly, and ensures the waterproof performance, the safety and the stability of the structure by providing the sealing member at a connection position.

In order to achieve the above purpose, the present disclosure provides the following technical solutions:

A wristband device with switchable screen, wherein the wristband device includes a screen, wherein the wristband device with switchable screen further includes: a middle frame provided with a roller which is rotatable and a through hole configured to facilitate the roller to be rotated from an outside of the middle frame; a window frame 1 body provided with a light transmitting window, wherein one side of the light transmitting window is provided with a light sensor assembly configured to detect a rotation of the roller and connected to a controller, and the other side of the light transmitting window is fixed to the middle frame, and the roller is located between the middle frame and the window frame body; and a sealing member sealed between the window frame body and the middle frame, wherein the sealing member has an annular shape and surrounds a periphery of the through hole, to implement waterproof sealing between the through hole and an inside of the middle frame.

Preferably, the light sensor assembly includes a light emitting device configured to emit light to the roller, a sensor configured to sense a light reflected from the roller, and a flexible circuit board connected to the controller and the sensor.

Preferably, the window frame body is provided with a stopper snap-fitted to the sensor to limit a movement of the sensor.

Preferably, the middle frame is fastened to the window frame body by a screw.

Preferably, the window frame body is connected to a cover plate by the screw, and the light emitting device or the sensor is pressed by the cover plate to contact with the window frame body.

Preferably, the window frame body is provided with an annular groove, the sealing member is provided in the annular groove, and the sealing member partially extends out of the annular groove before installing the middle frame.

Preferably, the sealing member is a silica gel sealing ring.

Preferably, the silica gel sealing ring is fixed to the annular groove by backed adhesive.

Preferably, the window frame body is provided with a protruding member elastically protruding toward and contracting away from the roller, and the roller is provided with a groove, when the roller is rotated to a position where the protruding member is snap-fitted to the groove, the roller is rotated to a preset angle is detected by the light sensor assembly, and the light sensor assembly transmits a detection signal to the controller.

Preferably, the roller is provided with at least three grooves respectively configured to be snap-fitted to the same protruding member when rotated to different angles.

In wristband device with switchable screen according to the present disclosure, the through hole is provided in the middle frame, and the rotatable roller is provided at the through hole, so that the rotating of the roller may be operated from the outside of the middle frame. The inside of the middle frame is attached to the window frame body, and the inside of the window frame body is provided with the light sensor, to sense the rotation of the roller and transmit it to the controller. The sealing member with the annular shape is provided between the middle frame and the window frame body, and surrounds the position of the through hole, to isolate the moisture outside of the middle frame from the outside of the through hole and prevent the moisture from entering the position of the window by the through hole, so as to protect the light sensor at the window and the controller connected thereto from being affected by the moisture.

Wristband device with switchable screen according to the present disclosure senses the change of the roller by the light sensor, so that the controller can realize the control to the adjustment of the screen, and waterproof sealing is formed between the outside of the roller and the inside of the window by the sealing member, which can meet the waterproof requirements of 5 ATM and has high reliability.

BRIEF DESCRIPTION OF DRAWINGS

In order to more clearly illustrate the technical solutions in the embodiments of the present disclosure or the prior art, the drawings required to be used for the content of the embodiments or the prior art will be briefly introduced in the following. Obviously, the drawings in the following description are merely some embodiments of the present disclosure, and for those of ordinary skill in the art, other drawings can also be obtained from the provided drawings without any creative effort.

In the drawings, reference numbers are.

1: middle frame, 2: roller, 3: protrusion, 4: spring, 5: protrusion housing, 6: sealing member, 7: window frame body, 8: light sensor assembly, 9: screw, 10: cover plate; 11: through hole; 71: stopper, 72: annular groove, 73: step, 81: sensor.

DETAILED DESCRIPTIONS

Technical solutions of embodiments of the present disclosure will be described below with reference to the drawings in the embodiments of the present disclosure. Obviously, the described embodiments are only a part of the embodiments of the present disclosure, rather than all the embodiments. On the basis of the above embodiments according to the present disclosure, all other embodiments obtained by those of ordinary skill in the art without creative efforts shall fall within the protection scope of the present disclosure.

A main purpose of the present disclosure is to provide a wristband device with switchable screen, which is capable of controlling the screen by sensing the rotation of the roller by the light sensor. In addition, a sealing member is provided at a connection position, which ensures the waterproof performance, the safety and the stability of the structure.

Figure 1:
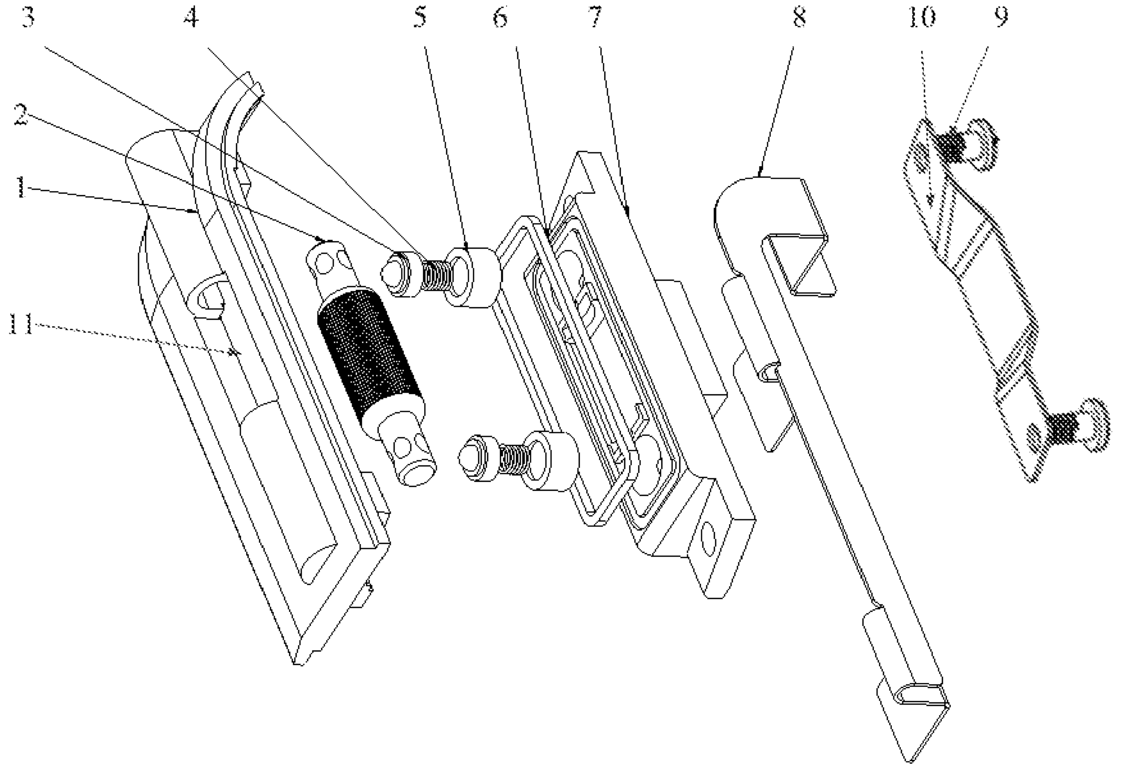
FIG. 1 is an exploded schematic diagram of a wristband device with switchable screen according to the present disclosure.
Figure 2:
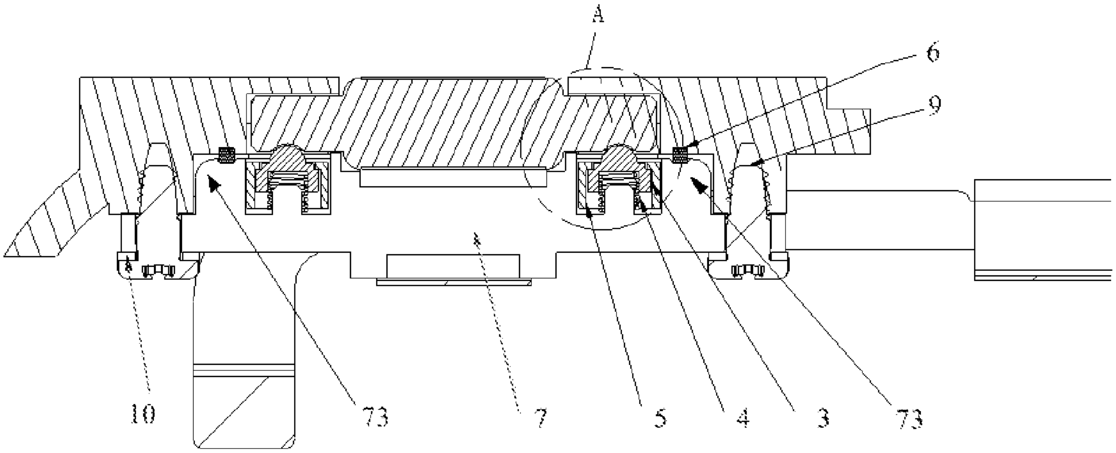
FIG. 2 is a cross-sectional view of the wristband device with switchable screen according to the present disclosure.
Figure 3:
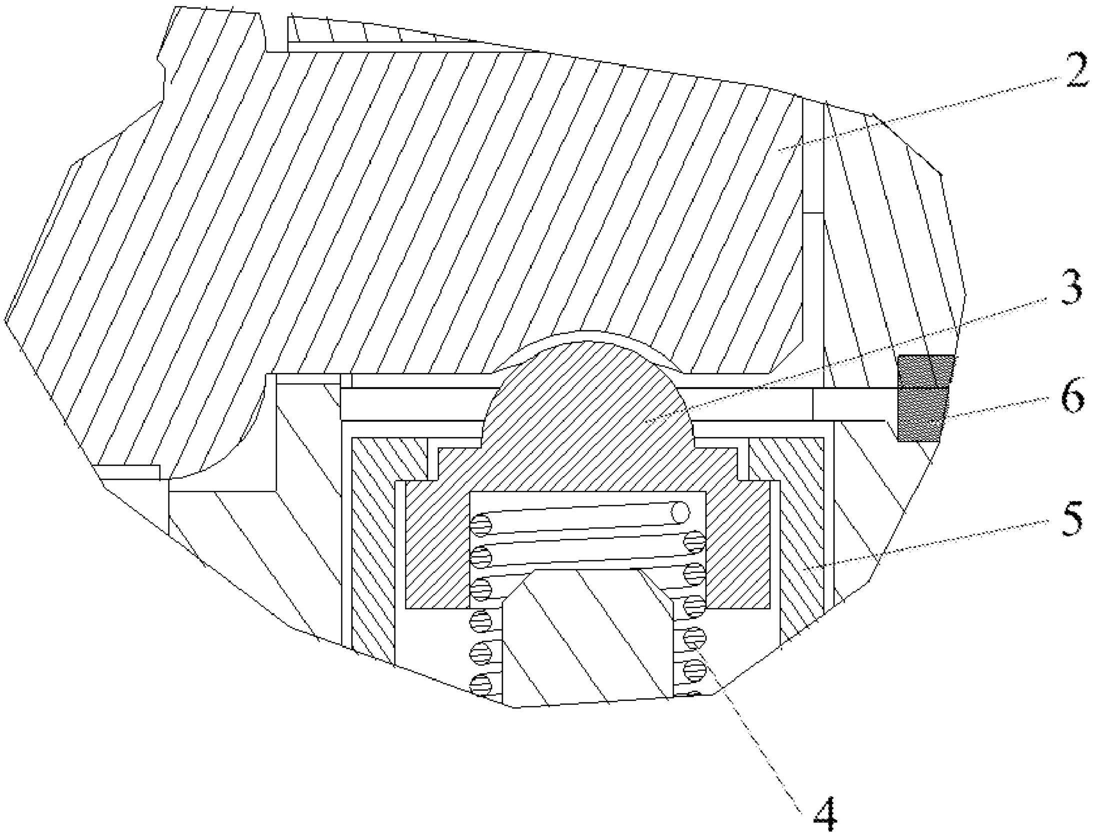
FIG. 3 is a partial schematic diagram at a region A in FIG. 2.
Figure 4:
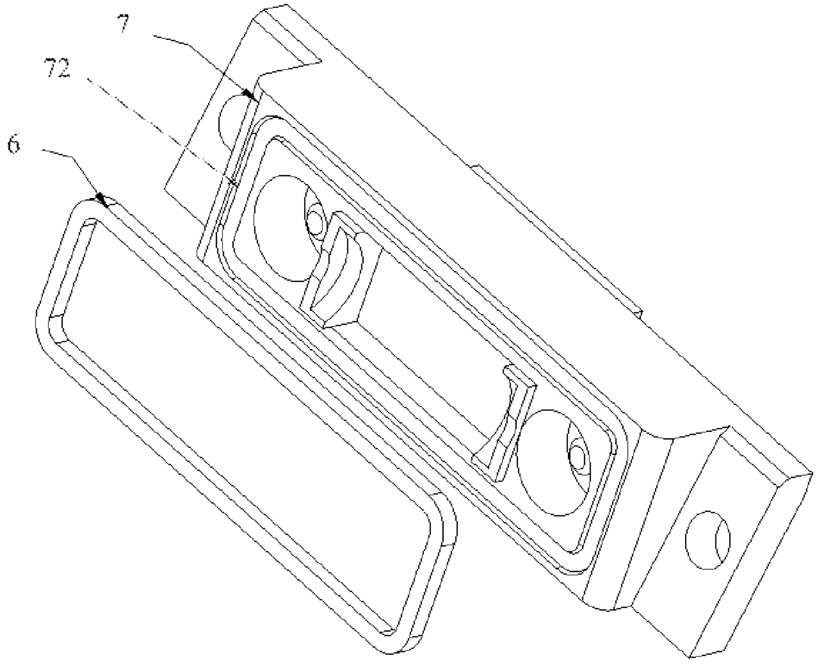
FIG. 4 is a schematic diagram that a sealing member is disposed at a window frame body according to the present disclosure.
Figure 5:
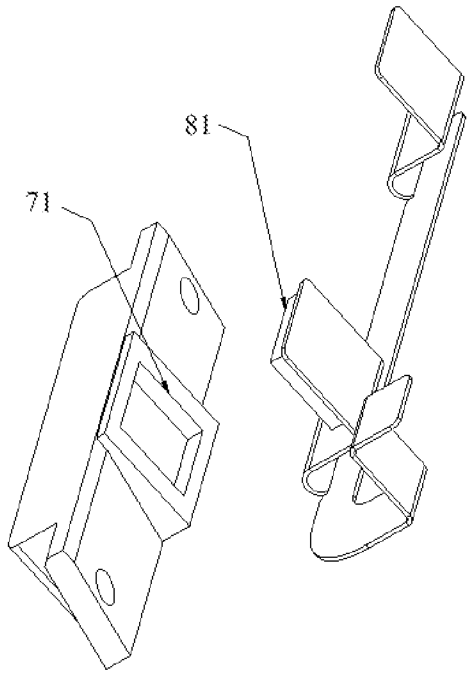
FIG. 5 is a schematic diagram of the window frame body and a light sensor assembly according to the present disclosure.
Figure 6:
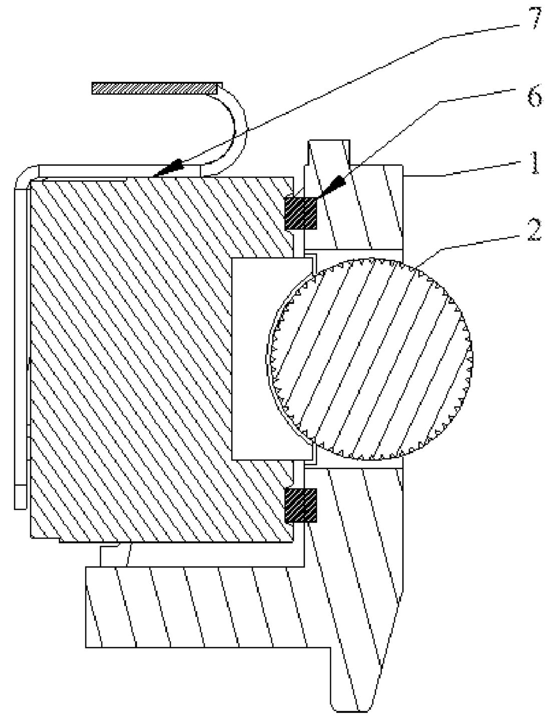
FIG. 6 is a cross-sectional view of a middle position of a roller according to the present disclosure.
Figure 7:
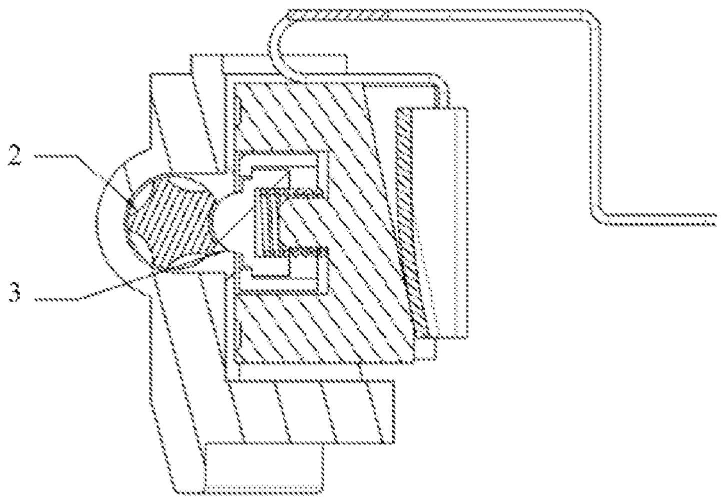
FIG. 7 is a cross-sectional view of a position of an end of the roller according to the present disclosure.

Please refer to FIG. 1 to FIG. 7, the present disclosure provides a wristband device with switchable screen, the wristband device may be a watch or a wristband, etc. The structure mainly includes: a screen, a middle frame 1, a window frame body 7, a roller 2, a sealing member 6 and a controller.

The middle frame 1 is a frame on which the roller 2 is disposed. The middle frame 1 is provided with a through hole 11 in which the roller 2 is provided. After being installed, the roller 2 may be rotated relative to the through hole 11, and the roller 2 can be rotated from the outside of the middle frame 1 at the position of the through hole 11. The end or the middle portion of the roller 2 is rotatably provided in the middle frame 1. The middle frame 1 may be provided with two opposite mounting grooves. Both ends of the roller 2 are inserted into the mounting grooves and may be rotated in the mounting grooves. A rotation axis of the roller 2 may be parallel to an outer surface of the middle frame 1, and may be parallel to a plane where the screen is located at the same time.

The window frame body 7 is another frame body connected with the middle frame body 1, which is provided with a light transmitting window, one side of the light transmitting window is provided with a light sensor assembly 8 configured to detect a rotation of the roller 2, the light sensor assembly 8 is connected to a controller, the middle frame 1 is attached to the other side of the window frame body 7, and the roller 2 is located between the middle frame 1 and the window frame body 7.

The sealing member 6 seals between the window frame body 7 and the middle frame 1, the sealing member 6 has an annular shape, and the sealing member 6 surrounds a periphery of the through hole 11, to realize waterproof sealing between the through hole 11 and an inside of the middle frame 1.

It should be understood that, the center portion of the window frame body 7 is provided with a light transmitting window, to allow light passes through. At one side of the light transmitting window, the roller 2 will rotate to reflect light at different angles. The reflected light passes through the light transmitting window to the light sensor assembly 8, the light sensor assembly 8 detects the change of the reflected light, and transmits the detected result to the controller. The controller controls the switch of the screen according to the specific situation of the change of received reflected light, specifically, the control may include controlling the switch of the screen when rotating to a preset angle, or making decisions on it according to the rotation speed, the rotation direction, etc.

In the above structure, one side of the window frame body 7 is provided with the roller 2, and the other side of the window frame body 7 is provided with the light sensor assembly 8. It can be known that the roller 2 should perform certain functions and should be connected to the outside, while the light sensor assembly 8 should be connected with the controller, and the mounting position thereof should be determined in consideration of waterproof performance of the device. Therefore, according to the present disclosure, by providing a sealing member 6 between the middle frame 1 and the window frame body 7, to separate the through hole 11 from the light sensor assembly 8, which prevents the moisture from entering the light sensor assembly 8 in the process of using the device.

In wristband device with switchable screen according to the present disclosure, the through hole 11 is provided in the middle frame 1, and the roller 2 which is rotatable is provided at the through hole 11. The shape of the through hole 11 is designed to facilitate the rotation of the roller 2. For example, the through hole 11 may be a rectangular hole, the middle of the roller 2 is positioned in the through hole, and the two ends of the roller 2 is rotatably provided at two sides of the through hole, so that the rotating of the roller 2 may be operated from the outside of the middle frame 1. The inside of the middle frame 1 is attached to the window frame body 7, and the inside of the window frame body 7 is provided with the light sensor assembly 8, to sense the rotation of the roller 2 and sent it to the controller. The sealing member 6 with the annular shape is provided between the middle frame 1 and the window frame body 7, and surrounds the position of the above through hole 11, prevents the moisture outside the middle frame 1 from entering into the device, and the window through the through hole 11, so as to protect the light sensors in the window and the controllers connected to the window from being affected by the moisture.

Wristband device with switchable screen according to the present disclosure senses the change of the roller by the light sensor, so that the controller can realize the control to adjust the screen, and waterproof sealing is ensured between the outside of the roller and the inside of the window by the sealing member 6.

Optionally, the transparent window may be a transparent glass or a transparent plastic component.

In addition to the above, the light sensor assembly 8 may further include a light emitting device for emitting light to the roller 2, a sensor 81 for sensing the light reflected from the roller 2, and a flexible circuit board connected to the controller and the sensor 81.

The light sensor assembly 8 has a function of emitting light, specifically, the light sensor assembly 8 includes the light emitting device, the sensor 81 and the flexible circuit for connection the light emitting device and the sensor 81. The light emitting device may be used to emit light, the light is emitted to a direction of the roller 2, and is irradiated on the roller 2 after passing through the light transmitting window, and the light reflected by the roller 2 is irradiated on the sensor 81 at one side of the light emitting device after passing the light transmitting window. The sensor 81 receives the signal and transmits the signal to the controller by the flexible circuit board. The above light may be infrared light.

This embodiment uses a light sensor assembly 8 with its own light source. Optionally, the sensor 81 may detect specifical infrared light. Compared with the case of a sensor 81 without a light source, this embodiment may avoid inaccurate detection due to light emitted or reflected by other external structures, the detection accuracy can be improved.

In this embodiment, the light sensor assembly 8 may be a light source optical navigation chip, which may measure the change of the rotation position of the roller 2 by obtaining continuous surface images optically, and the controller may determine the movement direction and the distance by a mathematical method, and may control the switching of the screen by reading and converting the change of position information.

Optionally, in addition to selecting the infrared light for output and detection, other specific light can also be used.

Optionally, the structure of the roller 2 has a change in a circumferential direction, so that during the rotation, the reflection ability, the reflection direction, etc. of the light are changed.

The sensor 81 and the light emitting device are provided at one side of the light transmitting window, in consideration of the relative position relationship between the sensor 81 and the light emitting device and the roller 2 which should be maintained, when the roller 2 rotates, the sensor 81 and the light emitting device maintains a fixed distance with an axis of the roller 2.

On the basis of the above embodiment, the window frame body 7 may be further with a stopper, and the sensor 81 snap-fitted to the stopper 71 to limit movement of the sensor 81.

The stopper may be a position limiting structure provided on the window frame body 7, for example, the stopper may be a protrusion structure the same as the structure of a profile of the sensor 81, to limit the movement of the sensor 81 and to avoid misalignment.

Optionally, the stopper 71 may be further adhered to the sensor 81, in order to fully fix the sensor 81.

The middle frame 1 and the window frame body 7 may be connected and fixed in various methods. Here, on the basis of the above embodiment, the middle frame 1 and the window frame body 7 are fastened by a screw 9.

Optionally, each of the cover plate 10, the middle frame 1 and the window frame body 7 may be provided with screw holes, and when the cover plate 10, the middle frame 1 and the window frame body 7 are overlapped, they may be fixed by the screw 9.

Optionally, screw holes may also be provided in the middle frame 1 and the cover plate 10, and the middle frame 1 and the cover plate 10 are connected by the screw 9. The window frame body 7 is coupled to the middle frame 1 or the cover plate 10, and the middle frame 1 and the cover plate 10 are fixed by coupling and clamping of the middle frame 1 and the cover 10.

On the basis of the above embodiments, the light emitting device or the sensor 81 is pressed toward and contact with the window frame body 7 due to the press force of the cover plate 10. As the cover plate 10 is fixed on the window frame body 7, the cover plate 10 will press the light emitting device or the sensor 81 on the light transmitting window or the window frame body 7, so as to fix the light emitting device or the sensor 81 in the light emission direction, so that the light emitting device or the sensor 81 may be completely fixed, to ensure the position relationship between the light emitting device or the sensor 81 and the light transmitting window.

Optionally, the light emitting device or the sensor 81 may be fixed by adhesion.

In one specific embodiment, the window frame body 7 is provided with an annular groove 72, the sealing member 6 is provided in an annular groove 72, and the sealing member 6 partially extends out of the annular groove 72 before the installation of the middle frame 1.

Alternatively, the middle frame 1 is provided with the annular groove 72, and the sealing member 6 is provided in the annular groove 72 of the middle frame 1.

In addition, a protrusion structure is provided on the window frame body 7 or the middle frame 1, to press the sealing member 6 to a preset position.

It should be understood that a diameter or a width of the annular groove 72 should be greater than a diameter or a width of the through hole 11 and should be located outside of the periphery of the through hole 11, so that the through hole is located inside of the annular groove 72, to be completely sealed.

The sealing member 6 is provided in the annular groove 72, and it is necessary to maintain the whole of sealing member 6 in the circumferential direction has several parts protrude from the annular groove 72, to avoid uneven sealing.

Optionally, the sealing member 6 is a silica gel sealing ring. The silica gel sealing ring should to be a closed structure in the circumferential direction, which may be a circular ring, a rectangular ring or rings with other shapes. Or, it may be made of other materials suitable for sealing.

Optionally, the silica gel sealing ring is fixed to the annular groove 72 by backed adhesive. The window frame body 7 is provided with a protruding step 73 protruding towards the middle frame 1, the step 73 is snap-fitted to the groove at the middle of the middle frame 1, the annular groove 72 is provided on the step 73. On one aspect, the step 73 may match with the groove at the middle of the middle frame 1 to limit relative movement between the middle frame 1 and the window frame body 7 due to vibration, and on the other aspect, the step 73 may guide alignment of the annular groove 72 and the middle frame 1, which facilitate to pressing the sealing ring.

On the basis of the above embodiment, the window frame body 7 may be further provided with a protruding member elastically protruding toward and contracting away from the roller 2, and the roller 2 is provided with a groove.

It should be understood that the protruding member has elasticity, it may be an elastically protruding and contracting structure, or it may be a rigid structure connected with an elastic part. The protruding member may move towards or away from the roller 2, and the roller 2 is provided with a groove, during the rotation of the roller 2, the protruding member may be snap-fitted to the groove, in a coupled state, it has a force suppressing the rotation of the roller 23 by a resistance force opposite to the rotation direction.

Grooves may be provided at different positions of the roller 2 in an axial direction. For example, both ends of the roller 2 in the axial direction are provided with a group of grooves in the circumferential direction, respectively. The two groups of grooves are symmetrically provided with respect to the through hole 11 of the middle frame 1.

The roller 2 may be provided with at least two grooves in the circumferential direction, and the two grooves are provided sequentially in the circumferential direction. A number of grooves at the same positions in the axial direction are disposed in the circumferential direction, and a plurality of grooves at the same positions in the axial direction are coupled to or separated from the one corresponding protruding member. During the rotation of the roller 2, the grooves at different positions in the axial direction may be coupled to corresponding protruding members at the same time, and detached from the corresponding protruding members at the same time.

Optionally, the protruding member may be disposed at the position of the step 73.

In addition, the protruding member may be combined with the detection of the roller 2, for example, a time of the detection of the special structure on the roller 2 by the light sensor assembly 8 is set to corresponding to a time of coupling the protruding member to the groove. In a specific embodiment, when the roller 2 is rotated to the protruding member to be snap-fitted to the groove, the roller 2 is rotated to the preset angle is detected by the light sensor assembly 8, and the light sensor assembly 8 transmits a detection signal to the controller.

Therefore, when the roller 2 is rotated to the preset angle is detected by the light sensor assembly 8, the light sensor assembly 8 transmits the detection signal to the controller, such that the controller controls the content of the screen to switch. At the same time, the protruding member and the groove are in a coupled state, thus the operator may have a resistance force, so as to confirm that the operation thereof arrives a special state corresponding to the switching of the content of the screen.

In this embodiment, the state that the protruding member and the groove are coupled is corresponding to the detection of the roller 2 to switch the screen, so as to provide the user with the corresponding sensing effect and improve the experience of the user.

Optionally, the roller 2 is provided with at least three grooves configured to be snap-fitted to the same protruding member when rotated to different angles.

The protruding member of the present disclosure includes a protrusion 3, a protrusion housing 5 and a spring 4, wherein the protrusion 3 is provided in the protrusion housing 5 and partially exposed by a through hole of the protrusion housing 5. The protrusion 3 and the protrusion housing 5 are connected by the spring 4, such that the protrusion 3 is pushed toward the outside by the elasticity of the spring 4.

In a specific embodiment, each of the middle frame 1 and the window frame body 7 may be provided with structures coupled to the roller 2 in the axial direction and the radial direction, respectively. For example, in FIG. 3, the window frame body 7 is provided with a coupling protrude to fix the roller 2 in the axial direction and the radial direction.

Grooves may be correspondingly provided at both ends of the roller 2, to be coupled to the two protruding members of the window frame body 7, to form a uniform resistance force.

The installation process for wristband device with switchable screen according to the present disclosure may be described below:

Step 1, installing the roller 2 on the middle frame 1. Here, it should be ensured that the roller 2 can be rotated freely inside the middle frame 1, i.e., the roller 2 and the middle frame 1 may be matched with a gap, and during this step, a jig may be used to pre-fix the roller 2, to ensure that the roller cannot fall out of the middle frame. After the roller 2 is installed, remove the jig.

Step 2, fixing the protrusion 3 with the protrusion housing 5, installing the spring 4 in the protrusion housing 5, and the protrusion 3, the spring 4 and the protrusion housing 5 as a whole is assembled to an alignment structure of the window frame body 7. The above fixing method may be welding, bonding, and etc.;

Step 3, installing the light sensor assembly 8 on the window frame body 7, to ensure an assembly gap of 0.05 mm between a profile of the sensor 81 and the window frame body 7 or the window, the light sensor assembly 8 can be pre-fixed, to ensure that it cannot fall out of the window frame body 7 during assembly;

Step 4, fixing the sealing member 6 in the annular groove 72; and

Step 5: finally, fixing the middle frame 1 and the window frame body 7 together by the cover 10 plate and the screw 9.

Wristband device with switchable screen provided in the above solutions detects the rotation of the roller 2 by the combination of the sensor and the light emitting device and feedbacks it to the controller to control the switching of the screen. The sealing member 6 is provided in the structure, to ensure the isolation between the internal structure and the external structure and to avoid the influence to the inside by the external moisture. The installation processes of the structure are simple and easy to implement, and it can meet the waterproof requirement of 5 ATM, and it has high structural reliability.

In addition to the main structure and the connection relationship between the wristband device and the switchable screen provided by the various embodiments above, the structure of other parts of the wristband device is referred to prior art and is not described herein.

Respective embodiments in the description are described in a progressive manner, and each embodiment focuses on its differences from other embodiments, the same and similar parts of the respective embodiments may be referred to each other.

Wristband device with switchable screen according to the present disclosure is described in detail. According to the present disclosure, specific examples are used to explain the principle and embodiments of the present disclosure. The above embodiments are only used to help to understand the method of embodiments and its core ideas. It should be pointed out that for those of ordinary of those skilled in the art, without deviating from the principle of the present disclosure, several improvements and modifications may also be made to the present disclosure, and these improvements and modifications also fall within the protection scope of claims of the present disclosure.

What is claimed is:

1. A wristband device with switchable screen comprising a screen, wherein the wristband device with switchable screen further comprises:

a middle frame provided with a roller which is rotatable and a through hole configured to facilitate the roller to be rotated from an outside of the middle frame;

a window frame body provided with a light transmitting window, wherein one side of the light transmitting window is provided with a light sensor assembly configured to detect a rotation of the roller and connected to a controller, and the other side of the light transmitting window is fixed to the middle frame, and the roller is located between the middle frame and the window frame body; and a sealing member sealed between the window frame body and the middle frame, wherein the sealing member has an annular shape and surrounds a periphery of the through hole, to implement waterproof sealing between the through hole and an inside of the middle frame, and wherein a rotation axis of the roller is parallel to an outer surface of the middle frame that is opposite to the window frame body.

2. The wristband device with switchable screen according to claim 1, wherein the light sensor assembly comprises a light emitting device configured to emit light to the roller, a sensor configured to sense a light reflected from the roller and a flexible circuit board connected to the controller and the sensor.

3. The wristband device with switchable screen according to claim 2, wherein the window frame body is provided with a stopper snap-fitted to the sensor to limit movement of the sensor.

4. The wristband device with switchable screen according to claim 1, wherein the middle frame is fastened to the window frame body by a screw.

5. The wristband device with switchable screen according to claim 4, wherein the window frame body is connected to a cover plate by the screw, and the light emitting device or the sensor is pressed by the cover plate to contact with the window frame body.

6. The wristband device with switchable screen according to claim 1, wherein the window frame body is provided with an annular groove, the sealing member is provided in the annular groove, and the sealing member partially extends out of the annular groove before installing the middle frame.

7. The wristband device with switchable screen according to claim 6, wherein the sealing member is a silica gel sealing ring.

8. The wristband device with switchable screen according to claim 6, wherein the silica gel sealing ring is fixed to the annular groove by backed adhesive.

9. The wristband device with switchable screen according to claim 1, wherein the window frame body is provided with a protruding member elastically protruding toward and contracting away from the roller, and the roller is provided with a groove, when the roller is rotated to a position where the protruding member is snap-fitted to the groove, the roller is rotated to a preset angle is detected by the light sensor assembly, and the light sensor assembly transmits a detection signal to the controller.

10. The wristband device with switchable screen according to claim 9, wherein the roller is provided with at least three grooves respectively configured to be snap-fitted to the same protruding member when rotated to different angles.

* * * * *